US012099233B2

United States Patent
Wang et al.

(10) Patent No.: US 12,099,233 B2
(45) Date of Patent: Sep. 24, 2024

(54) LARGE-EFFECTIVE-MODE-AREA LOW-LOSS OPTICAL FIBER WITH OPTIMIZED CLADDING COMPONENTS

(71) Applicant: JIANGSU ETERN OPTICAL FIBER TECHNOLOGY CO., LTD., Suzhou (CN)

(72) Inventors: Longfei Wang, Suzhou (CN); Fan Li, Suzhou (CN); Lihong Sui, Suzhou (CN)

(73) Assignee: JIANGSU ETERN OPTICAL FIBER TECHNOLOGY CO., LTD., Jiangsu (CN)

( * ) Notice: Subject to any disclaimer, the term of this patent is extended or adjusted under 35 U.S.C. 154(b) by 176 days.

(21) Appl. No.: 17/922,135

(22) PCT Filed: Jul. 20, 2020

(86) PCT No.: PCT/CN2020/102938
§ 371 (c)(1),
(2) Date: Dec. 23, 2022

(87) PCT Pub. No.: WO2021/217905
PCT Pub. Date: Nov. 4, 2021

(65) Prior Publication Data
US 2023/0176277 A1    Jun. 8, 2023

(30) Foreign Application Priority Data
Apr. 30, 2020  (CN) .......................... 202010360880.9

(51) Int. Cl.
G02B 6/02    (2006.01)
G02B 6/036   (2006.01)

(52) U.S. Cl.
CPC ..... G02B 6/02009 (2013.01); G02B 6/02395 (2013.01); G02B 6/03655 (2013.01); G02B 6/03683 (2013.01)

(58) Field of Classification Search
None
See application file for complete search history.

(56) References Cited

U.S. PATENT DOCUMENTS

| 8,879,879 B2 * | 11/2014 | Hammerle | ........ C03B 37/01861 |
| | | | 385/127 |
| 2013/0136407 A1 * | 5/2013 | Berkey | ................ G02B 6/0286 |
| | | | 385/124 |
| 2013/0322837 A1 * | 12/2013 | Bickham | .............. G02B 6/0281 |
| | | | 385/124 |

FOREIGN PATENT DOCUMENTS

| CN | 101910896 A | 12/2010 |
| CN | 102122017 A | 7/2011 |

(Continued)

*Primary Examiner* — Chris H Chu
(74) *Attorney, Agent, or Firm* — SZDC Law PC

(57) ABSTRACT

The present invention provides a large-effective-mode-area low-loss optical fiber with optimized cladding components, which comprises a core layer and a cladding comprising, from the inside to the outside, a first sinking layer, a second sinking layer, an optional third sinking layer, and an outer cladding. In the present invention, phosphorus and aluminum are co-doped in the optical fiber cladding, to form a tetrahedron [$AlPO_4$] in glass, thus optimizing the viscosity of the cladding while effectively reducing the refractive index of the cladding, without causing increased hydrogen loss. The process is simple, and highly repeatable.

10 Claims, 4 Drawing Sheets

(56) References Cited

FOREIGN PATENT DOCUMENTS

| | | |
|---|---|---|
| CN | 102396119 A | 3/2012 |
| CN | 104865634 A | 8/2015 |
| CN | 104898201 A | 9/2015 |
| CN | 105866879 A | 8/2016 |
| CN | 109154699 A | 1/2019 |
| CN | 109445023 A | 3/2019 |
| CN | 109655961 A | 4/2019 |
| JP | 6022822 B2 | 11/2016 |

* cited by examiner

LARGE-EFFECTIVE-MODE-AREA LOW-LOSS OPTICAL FIBER WITH OPTIMIZED CLADDING COMPONENTS

This application is the National Stage Application of PCT/CN2020/102938, filed on Jul. 20, 2020, which claims priority to Chinese Patent Application No. 202010360880.9, filed on Apr. 30, 2020, which is incorporated by reference for all purposes as if fully set forth herein.

FIELD OF THE INVENTION

The present application relates to the technical field of transmission technologies in communications, and particularly to a large-effective-mode-area low-loss optical fiber with optimized cladding components.

DESCRIPTION OF THE RELATED ART

Long-distance communication has the characteristics of large capacity and high speed, and requires the optical fiber to have a higher nonlinear threshold and a lower transmission loss. Large-mode-field low-loss optical fiber is proposed to meet this requirement, and it has attracted extensive attention and research from optical communication R&D institutions and companies all over the world.

The most direct approach to improving the nonlinear threshold and signal-to-noise ratio is to increase the effective area of the optical fiber. However, the increase of the effective mode area will lead to the deterioration of the bending resistance of the optical fiber. Therefore, a low-refractive-index cladding is generally needed to be added the optical fiber cladding, to improve the bending resistance. The so-called low-refractive-index cladding generally means that the refractive index of the cladding is lower than that of simple quartz, can be achieved by doping with fluorine or boron. However, the doping of boron will cause the problem of deteriorated chromatic dispersion and increased loss of the optical fiber. Accordingly, the low-refractive-index cladding is generally achieved by the doping of fluorine in the industry. However, the doping of fluorine will lead to mismatched high-temperature viscosity, softening temperature and expansion of the low-refractive-index cladding and the fiber core. On the one hand, this causes the generation of residual stress in the preform rod and the optical fiber, and causes the increase of broken bonds in the low-refractive-index layer during the drawing process, finally causing increased transmission loss of the optical fiber and deteriorated mechanical strength. Therefore, it is necessary to optimize the glass components of the fiber core and/or low-refractive-index cladding, reduce the difference between the high-temperature viscosity, the softening temperature and the expansion of the fiber core and the low-refractive-index cladding, and reduce the transmission loss of the optical fiber.

Patent No. CN106458696A discloses a method for preparing a low-attenuation optical fiber by diffusing an alkali metal element into the optical fiber through thermal diffusion. However, the doping of an alkali metal alone will lead to an increase in hydrogen loss, which is not conducive to the long-term working stability of the optical fiber.

Patent No. CN109445023 A discloses that by doping phosphorus, fluorine and an alkali metal in the fiber core and cladding, matched viscosity of the fiber core and the cladding is achieved, to avoid the increased attenuation during hydrogen treatment caused by the doping of metals alone. However, this method requires the doping of phosphorus, fluorine and an alkali metal, so more components are present, the process is complex, the preparation difficulty is high, and the repeatability is low, which is not conducive to the cost reduction.

SUMMARY OF THE INVENTION

The definitions and explanations of some terms involved in the present invention are described below:
mol %: percentage by mole;
wt. %: percentage by weight.

The core layer of the optical fiber is defined as the layer closest to the axis starting from the most central axis of the optical fiber according to the change of refractive index. The outer cladding of the optical fiber is defined as the outermost layer of the optical fiber, that is, the pure silica layer.

Relative difference $\Delta n_i$ in refractive index of various layers in the optical fiber is defined by a formula below:

$$\Delta_{n_i} = \frac{n_i - n_s}{n_s} \times 100\%$$

where $n_i$ is the refractive index of the fiber core or the cladding, and $n_s$ is the refractive index of pure silica.

The contribution $\Delta_{Ge}$ of germanium doped in the core layer of the optical fiber to the difference in refractive index is defined by a formula below:

$$\Delta_{Ge} = \frac{n_{Ge} - n_s}{n_s} \times 100\%$$

where $n_{Ge}$ is the change in refractive index of the glass caused when germanium is doped into quartz glass alone.

The contribution $\Delta_F$ of fluorine doped in the optical fiber cladding to the difference in refractive index is defined by a formula below:

$$\Delta_F = \frac{n_F - n_s}{n_s} \times 100\%$$

where $n_F$ is the change in refractive index of the glass caused when fluorine is doped into quartz glass alone.

The contribution $\Delta_{AlP}$ of [AlPO$_4$] in the optical fiber cladding to the difference in refractive index is defined by a formula below:

$$\Delta_{AlP} = \frac{n_{AlP} - n_s}{n_s} \times 100\%$$

where $n_{AlP}$ is the change in refractive index of the glass caused by [AlPO$_4$] tetrahedron present alone in quartz glass.

The technical problem to be solved in the present invention is as follows. To solve the disadvantages in the prior art that the doping of an alkali metal element alone will cause the increased hydrogen loss of the optical fiber and deteriorated long-term working stability of the optical fiber and that the doping of phosphorus, fluorine and an alkali metal element in the optical fiber core and cladding causes the involving of more elements, complex process, high preparation difficulty, low repeatability, and difficulty in cost reduction, a large-effective-mode-area low-loss optical fiber with optimized cladding components is provided.

To solve the above problems, the following technical solution is adopted in the present invention. A large-effective-mode-area low-loss optical fiber with optimized cladding components is provided, which includes a core layer and a cladding. The cladding includes, from the inside to the outside, a first sinking layer, a second sinking layer and an outer cladding.

The second sinking layer is a multi-doped quartz inner cladding, and the dopants comprise fluorine, aluminum and phosphorus. Aluminum and phosphorus are doped in an amount of 0-10 mol %, and have a continuous distribution, and the molar ratio of aluminum and phosphorus is 0.7-1.3:1. Aluminum and phosphorus are co-doped in glass to form a [AlPO4]] tetrahedron. The contribution of the [AlPO$_4$] tetrahedron to the refractive index of the second sinking layer is −0.8%-0, and the contribution of fluorine to the refractive index of the second sinking layer is −0.05%-0. The relative difference Δn2 in refractive index of the second sinking layer is −0.85%-0, and the radius R2 of the second sinking layer is 8-35 μm.

In the solution, preferably, the first sinking layer is a pure quartz layer or a multi-doped quartz inner cladding. When the first sinking layer is a multi-doped quartz inner cladding, the dopants comprise fluorine, aluminum and phosphorus. Aluminum and phosphorus are doped in an amount of 0-5 mol %, and have a continuous distribution, and the molar ratio of aluminum and phosphorus is 0.8-1.2:1. Aluminum and phosphorus are co-doped in glass to form a [AlPO$_4$] tetrahedron. The contribution of the [AlPO$_4$] tetrahedron to the refractive index of the first sinking layer is −0.4%-0, and the contribution of fluorine to the refractive index of the first sinking layer is −0.05%-0. The relative difference Δn1 in refractive index of the first sinking layer is −0.55%-0, and the radius R1 of the first sinking layer is 6-20 μm.

Further preferably, the outer cladding is a pure quartz cladding or a multi-doped quartz cladding. when the outer cladding is a multi-doped quartz cladding, the dopants comprise fluorine, aluminum and phosphorus. Aluminum and phosphorus are doped in an amount of 0-5 mol %, and have a continuous distribution, and the molar ratio of aluminum and phosphorus is 0.9-1.1:1. The contribution of fluorine to the refractive index of the outer cladding is −0.02%-0, and the contribution of the [AlPO$_4$] tetrahedron to the refractive index of the outer cladding is −0.4%-0. The relative difference Δn4 in refractive index of the outer cladding is −0.42%-0, and the radius R4 of the outer cladding is 62.5 μm.

Preferably, the core layer is a multi-doped silica core layer, and the dopants comprise germanium and fluorine. The contribution of germanium to the refractive index of the core layer is 0-0.3%, and the contribution of fluorine to the refractive index of the core layer is −0.05%-0. Germanium and fluorine have a continuous distribution in the core layer. The relative difference Δn0 in refractive index of the core layer is 0-0.25%, and the radius R0 of the core layer is 5-8 μm.

In the above solution, the dopants in the first sinking layer and the second sinking layer respectively include fluorine, aluminum and phosphorus. Preferably, the amounts of aluminum doped in the first sinking layer and the second sinking layer are not both 0 mol %, and the amounts of phosphorus doped therein are not both 0 mol %.

Further, in the solution, preferably, fluorine is introduced through freon or silicon tetrafluoride, phosphorus is phosphorus pentoxide and introduced through the raw material phosphorus trichloride, and aluminum is alumina and introduced through the raw material aluminum chloride.

In another preferred embodiment of the present invention, the low-loss optical fiber with optimized cladding components further comprises a third sinking layer, located between the second sinking layer and the outer cladding.

Further preferably, the third sinking layer is a multi-doped quartz inner cladding, and the dopants comprise fluorine, aluminum and phosphorus. Aluminum and phosphorus are doped in an amount of 0-5 mol %, and have a continuous distribution, and the molar ratio of aluminum and phosphorus is 0.7-1.3:1. The contribution of fluorine to the refractive index of the third sinking layer is −0.05%-0, and the contribution of the [AlPO$_4$] tetrahedron to the refractive index of the third sinking layer is −0.4%-0. the relative difference Δn3 in refractive index of the third sinking layer is −0.45%-0, and the radius R3 of the third sinking layer is 8-62.5 μm.

Preferably, the attenuation of the optical fiber at a wavelength of 1550 nm is less than or equal to 0.18 dB/km, more preferably less than or equal to 0.17 dB/km, and further more preferably less than or equal to 0.16 dB/km.

Preferably, after the optical fiber is reacted for at least 16 h in 0.01 vol % H$_2$ at 70° C., the change in attenuation of the optical fiber at a wavelength of 1550 nm is less than or equal to 0.01 dB/km, further preferably less than or equal to 0.002 dB/km. 0.01 vol % H$_2$ means that the concentration of H$_2$ in a mixed gas of H$_2$ and He is 0.01% by volume.

In another further specific embodiment of the present invention, a large-effective-mode-area low-loss optical fiber with optimized cladding components is provided, which includes a core layer and a cladding. The cladding includes, from the inside to the outside, a first sinking layer, a second sinking layer, an optional third sinking layer, and an outer cladding.

The core layer is a multi-doped silica core layer, and the dopants comprise germanium, fluorine, and others. The contribution of germanium to the refractive index of the core layer is 0-0.3%, and the contribution of fluorine to the refractive index of the core layer is −0.05%-0. Germanium and fluorine have a continuous distribution in the core layer. The relative difference Δn0 in refractive index of the core layer is 0-0.25%, and the radius R0 of the core layer is 5-8 μm.

The first sinking layer is a pure quartz layer, or a multi-doped quartz inner cladding. When the first sinking layer is a multi-doped quartz inner cladding, the dopants comprise fluorine, aluminum and phosphorus. Aluminum and phosphorus are doped in an amount of 0-10 mol %, and have a continuous distribution, and the molar ratio of aluminum and phosphorus is 0.8-1.2:1. Aluminum and phosphorus are co-doped in glass to form a [AlPO$_4$] tetrahedron, and the [AlPO4] tetrahedron can effectively reduce the refractive index of the glass. The contribution of fluorine to the refractive index of the first sinking layer is −0.05%-0, and the contribution of the [AlPO$_4$] tetrahedron to the refractive index of the first sinking layer is −0.8%-0. The relative difference Δn1 in refractive index of the first sinking layer is −0.85%-0, and the radius R1 of the first sinking layer is 6-20 μm.

The second sinking layer is a multi-doped quartz inner cladding, and the dopants comprise fluorine, aluminum and phosphorus. Aluminum and phosphorus are doped in an amount of 0-10 mol %, and have a continuous distribution, and the molar ratio of aluminum and phosphorus is 0.7-1.3:1. The contribution of fluorine to the refractive index of the second sinking layer is −0.05%-0, and the contribution of the [AlPO$_4$] tetrahedron to the refractive index of the second sinking layer is −0.8%-0. The relative difference Δn2 in refractive index of the second sinking layer is −0.85%-0, and the radius R2 of the second sinking layer is 8-35 μm.

Optionally, the third sinking layer is a multi-doped quartz inner cladding, and the dopants comprise fluorine, aluminum and phosphorus. Aluminum and phosphorus are doped in an amount of 0-5 mol %, and have a continuous distribution, and the molar ratio of aluminum and phosphorus is 0.7-1.3:1. The contribution of fluorine to the refractive index of the third sinking layer is −0.05%-0, and the contribution of the [AlPO4] tetrahedron to the refractive index of the third sinking layer is −0.4%-0. The relative difference Δn3 in refractive index of the third sinking layer is −0.45%-0, and the radius R3 of the third sinking layer is 8-62.5 μm.

The outer cladding is a pure quartz cladding or a multi-doped quartz cladding. When the outer cladding is a multi-doped quartz cladding, the dopants comprise fluorine, aluminum and phosphorus. Aluminum and phosphorus are doped in an amount of 0-5 mol %, and have a continuous distribution, and the molar ratio of aluminum and phosphorus is 0.9-1.1:1. The contribution of fluorine to the refractive index of the outer cladding is −0.02%-0, and the contribution of the [AlPO$_4$] tetrahedron to the refractive index of the outer cladding is −0.4%-0. The relative difference Δn4 in refractive index of the outer cladding is −0.42%-0, and the radius R4 of the outer cladding is 62.5 μm.

Fluorine is introduced through freon or silicon tetrafluoride, phosphorus is phosphorus pentoxide and introduced through the raw material phosphorus trichloride, and aluminum is alumina and introduced through the raw material aluminum chloride.

Beneficial Effects of the Present Invention

1. The cladding of the optical fiber provided in the present invention is doped mainly with aluminum and phosphorus, and with a small amount of fluorine. Aluminum and phosphorus form a [AlPO$_4$] tetrahedron in glass, which can optimize the viscosity of the cladding while effectively reducing the refractive index of the cladding, reduce the defects during the preparation of the optical fiber, reduce the axial stress of the optical fiber, and thus further reduce the attenuation parameter of the optical fiber.
2. No alkali metal is doped, to avoid the additional loss caused by hydrogen loss, and ensure the long-term working stability of the optical fiber.
3. The amount of fluorine doped in the core layer and cladding of the optical fiber provided in the present invention may be lower than 0.15 wt %. Therefore, the doped amount of fluorine is greatly reduced, which reduces the manufacturing cost while the optical fiber is ensured to have a better stability, and promotes the environmental protection. The process is simple, and highly repeatable.

BRIEF DESCRIPTION OF THE DRAWINGS

The technical solution of the present application is further described below with reference to accompanying drawing in connection with embodiments.

DETAILED DESCRIPTION OF THE PREFERRED EMBODIMENTS

Figure 1:
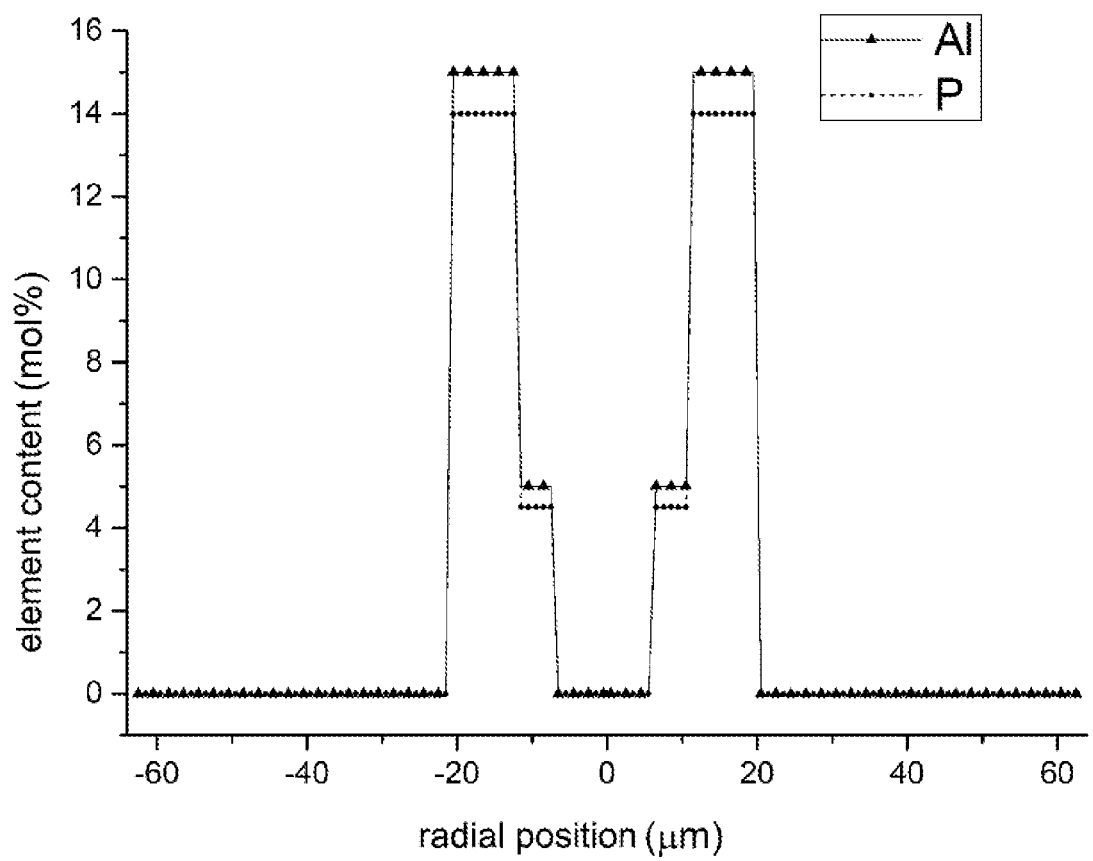
FIG. 1 shows the distribution of aluminum and phosphorus content in a typical optical fiber.
Figure 2:
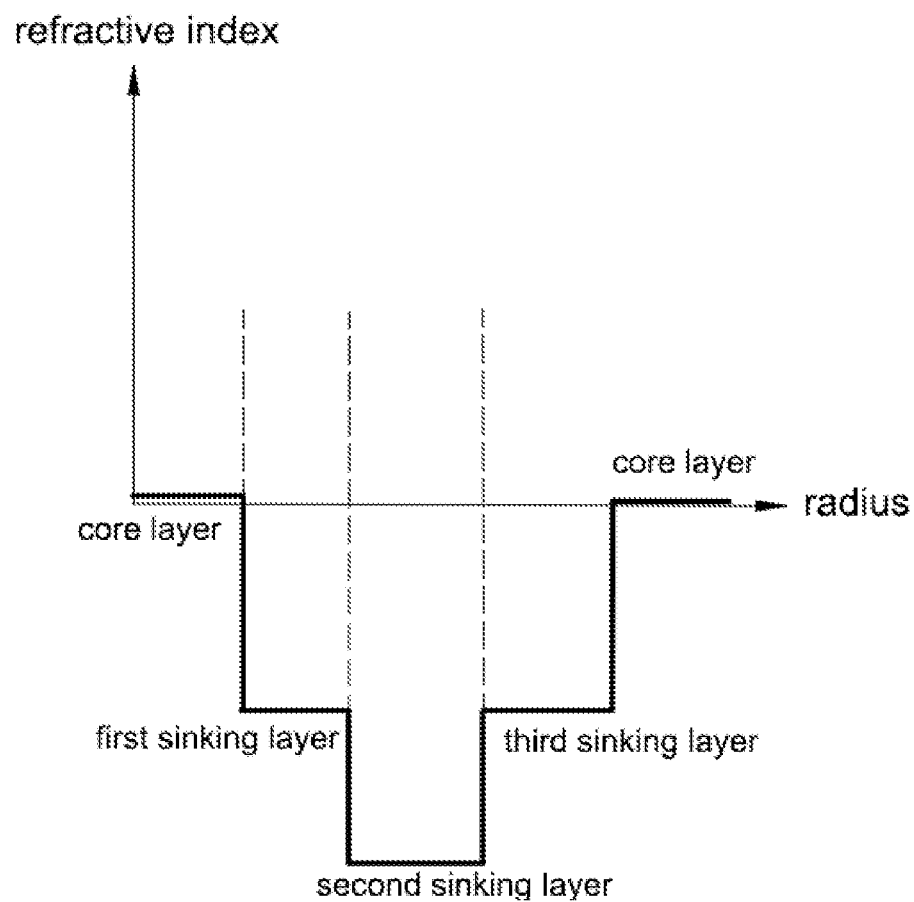
FIG. 2 is a schematic view of the refractive index along a cross section of an optical fiber in Example 1.
Figure 3:
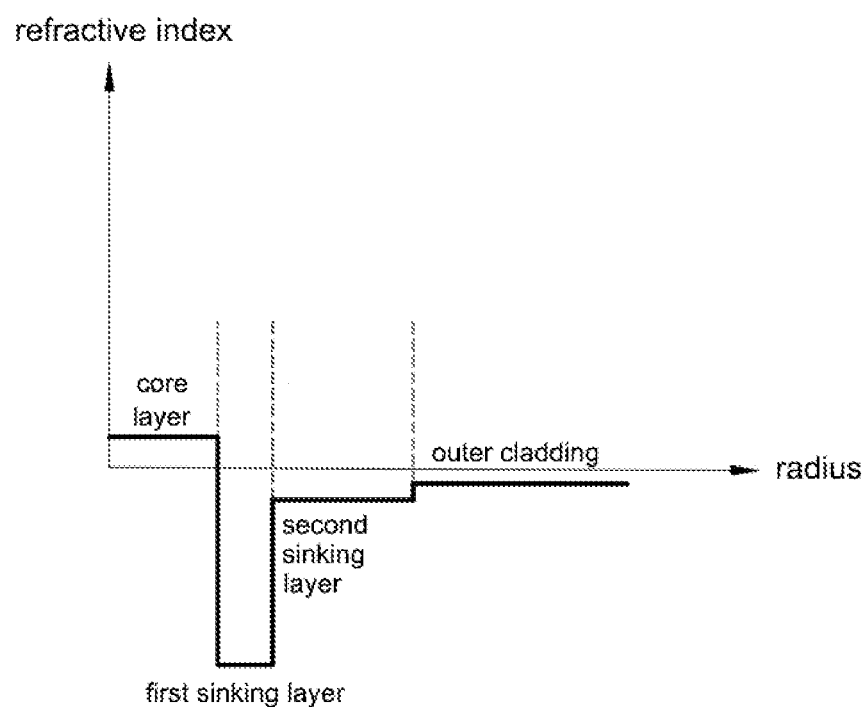
FIG. 3 is a schematic view of the refractive index along a cross section of an optical fiber in Example 2.
Figure 4:
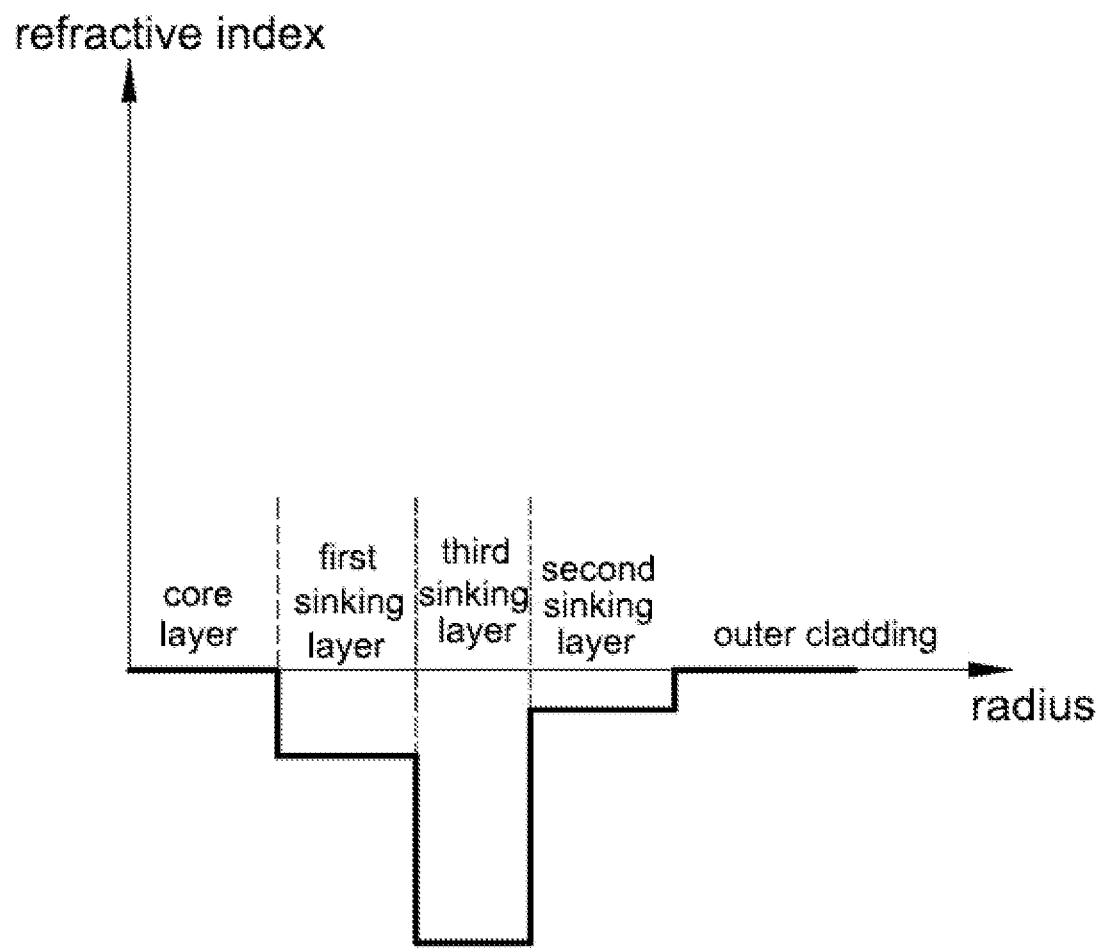
FIG. 4 is another schematic view of the refractive index along a cross section suitable for the present invention.

Hereinafter, the disclosure of the present invention is further elucidated and described with reference to specific examples. It should be noted that the embodiments and the features in the embodiments in the present application can be combined with each other without conflict.

In the following Example 1 and Comparative Examples 1-3, the optical fiber includes a core layer and a cladding. The radius of the core layer is R0, and the relative difference in refractive index of the core layer is Δn0. The cladding includes sequentially, from the inside to the outside, a first sinking layer, a second sinking layer, a third sinking layer and an outer cladding. The radius of the first sinking layer is R1, and the relative difference in refractive index is Δn1. The radius of the second sinking layer is R2, and the relative difference in refractive index is Δn2. The radius of the third sinking layer is R3, and the relative difference in refractive index is Δn3. The outer cladding has a radius of R4, and is a pure quartz cladding.

Example 1

The core layer of the optical fiber comprises germanium, fluorine, and silica, which have a continuous distribution in the core layer. The first sinking layer comprises fluorine, P$_2$O$_5$, Al$_2$O$_3$ and silica, where F has a content of 0.2 mol % and has a continuous distribution, the P$_2$O$_5$ content is 2.3 mol %, and the Al$_2$O$_3$ content is 2.3 mol %. The second sinking layer comprises P$_2$O$_5$, Al$_2$O$_3$ and silica, where the P$_2$O$_5$ content is 6.2 mol %, and the Al$_2$O$_3$ content is 6.5 mol %. The third sinking layer comprises fluorine, P$_2$O$_5$, Al$_2$O$_3$ and silica, where F has a content of 0.2 mol % and has a continuous distribution, the P$_2$O$_5$ content is 2.3 mol %, and the Al$_2$O$_3$ content is 2.3 mol %. The attenuation of the optical fiber at 1550 nm is 0.152 dB/km, and after the optical fiber is reacted for at least 16 h in 0.01% H$_2$ at 70° C., the change in attenuation of the optical fiber at 1550 nm is 0.001 dB/km.

Comparative Example 1

The core layer of the optical fiber comprises germanium, fluorine, silica, an alkali metal oxide, and P$_2$O$_5$, where the alkali metal oxide has a content of 100 ppm and has a continuous distribution; and P$_2$O$_5$ has a content of 100 ppm and has a continuous distribution in the core layer. The first sinking layer adjacent to the core layer comprises germanium, fluorine, silica, and an alkali metal oxide, where the alkali metal oxide (K$_2$O) has a content of 5 ppm and has a continuous distribution; and P$_2$O$_5$ has a content of 20 ppm and has a continuous distribution. The attenuation of the optical fiber at 1550 nm is 0.155 dB/km, and after the optical fiber is reacted for at least 16 h in 0.01% H$_2$ at 70° C., the change in attenuation of the optical fiber at 1550 nm is 0.004 dB/km. The specific parameters are listed in Table 1.

Comparative Example 2

The core layer of the optical fiber comprises germanium, sodium and silica, which have a continuous distribution in the core layer. The first sinking layer comprises fluorine and silica, where fluorine has a content of 2 mol % and has a continuous distribution. The second sinking layer comprises fluorine and silica, where F has a content of 3.8 mol % and has a continuous distribution. The third sinking layer comprises fluorine and silica, where fluorine has a content of 2 mol % and has a continuous distribution. The attenuation of the optical fiber at 1550 nm is 0.156 dB/km, and after the optical fiber is reacted for at least 16 h in 0.01% $H_2$ at 70° C., the change in attenuation of the optical fiber at 1550 nm is 0.008 dB/km.

Comparative Example 3

The core layer of the optical fiber comprises germanium, fluorine, potassium and silica, where the K content is 0.1 mol %, and the F content is 1.8 mol %. The first sinking layer comprises fluorine and silica, where fluorine has a content of 1.8 mol % and has a continuous distribution. The second sinking layer comprises fluorine and silica, where F has a content of 3.8 mol % and has a continuous distribution. The attenuation of the optical fiber at 1550 nm is 0.160 dB/km, and after the optical fiber is reacted for at least 16 h in 0.01% $H_2$ at 70° C., the change in attenuation of the optical fiber at 1550 nm is 0.01 dB/km.

Example 2

The optical fiber includes a core layer and a cladding. The core layer of the optical fiber is doped with germanium, and has a radium R0 of 8 μm. The relative difference Δn0 in refractive index of the core layer is 0.15%. The cladding includes sequentially, from the inside to the outside, a first sinking layer, a second sinking layer and an outer cladding. The radius R1 of the first sinking layer is 14 μm, and the relative difference Δn1 in refractive index is −0.8%. The radius R2 of the second sinking layer is 26 μm, and the relative difference Δn2 in refractive index is −0.14%. The radius of the outer cladding is 62.5 μm, and the relative difference in refractive index is −0.07%. The first sinking layer comprises $P_2O_5$, $Al_2O_3$ and silica, where $P_2O_5$ has a content of 10 mol %, and has a continuous distribution; and $Al_2O_3$ has a content of 11 mol %, and has a continuous distribution. The second sinking layer comprises $P_2O_5$, $Al_2O_3$ and silica, where $P_2O_5$ has a content of 1.8 mol %, and has a continuous distribution; and $Al_2O_3$ has a content of 1.75 mol %, and has a continuous distribution. The outer cladding comprises 0.7 mol % fluorine. The attenuation of the optical fiber at 1550 nm is 0.154 dB/km, and after the optical fiber is reacted for at least 16 h in 0.01% $H_2$ at 70° C., the change in attenuation of the optical fiber at 1550 nm is 0.0015 dB/km.

The doping parameters for the optical fiber prepared in the above Examples 1-2 and Comparative Examples 1-3 are shown in Table 1.

TABLE 1

Doping parameters for optical fiber prepared in examples of the present invention

| Core layer and cladding | Parameter | Example 1 | Comparative Example 1 | Comparative Example 2 | Comparative Example 3 | Example 2 |
|---|---|---|---|---|---|---|
| Core layer | Al | 0 | 0 | 0 | 0 | 0 |
| | P | 0 | 100 ppm | 0 | 0 | 0 |
| | K | 0 | 100 ppm | 0 | 0.1 mol % | 0 |
| | F | 0.1 mol % | / | 0 | 0.3 mol % | 0 |
| First sinking layer | Al | 2.3 mol % | 0 | 0 | 0 | 11 mol % |
| | P | 2.3 mol % | 20 ppm | 0 | 0 | 10 mol % |
| | K | 0 | 5 ppm | 0 | 0 | 0 |
| | F | 0.2 mol % | / | 2 mol % | 1.8 mol % | 0 |
| Second sinking layer | Al | 6.5 mol % | / | 0 | 0 | 1.75 mol % |
| | P | 6.2 mol % | / | 0 | 0 | 1.75 mol % |
| | F | 0 | / | 3.8 mol % | 3.8 mol % | 0 |
| Third sinking layer | Al | 2.3 mol % | / | 0 | 0 | 0 |
| | P | 2.3 mol % | / | 0 | 0 | 0 |
| | F | 0.2 mol % | / | 2 mol % | 2 mol % | 0.7 mol % |

In the optical fibers prepared in Example 1, Example 2, and Comparative Examples 1, 2 and 3, the values for the radius R1 of the first sinking layer, the relative difference Δn1 in refractive index, the radius R2 of the second sinking layer, the relative difference Δn2 in refractive index, the radius R3 of the third sinking layer, the relative difference Δn3 in refractive index, the radius R4 of the outer cladding, the radius R0 of the core layer, and the relative difference Δn0 in refractive index are shown in Table 2.

TABLE 2

Radius and relative difference in refractive index of the core layer and cladding of the optical fibers prepared in the examples of the present invention

| Parameter | Example 1 | Comparative Example 1 | Comparative Example 2 | Comparative Example 3 | Example 2 |
|---|---|---|---|---|---|
| Δn 0% | 0 | 0 | 0 | 0 | 0.15 |
| R0 [μm] | 5 | 5 | 5 | 5 | 8 |
| Δn1 [%] | −0.2 | −0.2 | −0.2 | −0.2 | −0.8 |
| R1 [μm] | 13 | 13 | 13 | 13 | 14 |
| Δn2 [%] | −0.5 | −0.5 | −0.5 | −0.5 | −0.14 |
| R2 [μm] | 20 | 20 | 20 | 20 | 26 |
| Δn3 [%] | −0.2 | −0.2 | −0.2 | −0.2 | / |
| R3 [μm] | 50 | 50 | 50 | 50 | / |
| Δn4 [%] | 0 | 0 | 0 | 0 | −0.07 |
| R4 [μm] | 62.5 | 62.5 | 62.5 | 62.5 | 62.5 |

Optical fibers with other set doping parameters described in the present invention can be prepared by a method similar to those in Examples 1-2 of the present invention.

As suggested by desirable embodiments of the present application, a variety of changes and modifications can be made by those skilled in the art according to the disclosure and embodiments described above, the suggestions without departing from the technical idea of the present application. The technical scope of the present invention is not limited to the disclosure of the specification, and the technical scope thereof is defined by the scope of the claims.

What is claimed is:

1. A large-effective-mode-area low-loss optical fiber with optimized cladding components, comprising a core layer and a cladding comprising, from inside to outside, a first sinking layer, a second sinking layer and an outer cladding, wherein the second sinking layer is a multi-doped quartz inner cladding, and dopants comprise fluorine, aluminum and phosphorus, wherein aluminum and phosphorus are doped in an amount of 0-10 mol %, and have a continuous distribution, the molar ratio of aluminum and phosphorus is 0.7-1.3:1, aluminum and phosphorus are co-doped in glass to form a [AlPO$_4$] tetrahedron, the contribution of the [AlPO$_4$] tetrahedron to the refractive index of the second sinking layer is −0.8%-0, the contribution of fluorine to the refractive index of the second sinking layer is −0.05%-0, the relative difference Δn2 in refractive index of the second sinking layer is −0.85%-0, and the radius R2 of the second sinking layer is 8-35 μm.

2. The optical fiber according to claim 1, wherein the first sinking layer is a pure quartz layer or a multi-doped quartz inner cladding, and when the first sinking layer is a multi-doped quartz inner cladding, dopants comprise fluorine, aluminum and phosphorus, wherein aluminum and phosphorus are doped in an amount of 0-10 mol %, and have a continuous distribution, the molar ratio of aluminum and phosphorus is 0.8-1.2:1, aluminum and phosphorus are co-doped in glass to form a [AlPO$_4$]] tetrahedron, the contribution of the [AlPO$_4$] tetrahedron to the refractive index of the first sinking layer is −0.8%-0, the contribution of fluorine to the refractive index of the first sinking layer is −0.05%-0, the relative difference Δn1 in refractive index of the first sinking layer is −0.85%-0, and the radius R1 of the first sinking layer is 6-20 μm.

3. The optical fiber according to claim 1, wherein the outer cladding is a pure quartz cladding or a multi-doped quartz cladding, and when the outer cladding is a multi-doped quartz cladding, dopants comprise fluorine, aluminum and phosphorus, wherein aluminum and phosphorus are doped in an amount of 0-5 mol %, and have a continuous distribution, the molar ratio of aluminum and phosphorus is 0.9-1.1:1, the contribution of fluorine to the refractive index of the outer cladding is −0.02%-0, the contribution of the [AlPO$_4$] tetrahedron to the refractive index of the outer cladding is −0.4%-0, the relative difference Δn4 in refractive index of the outer cladding is −0.42%-0, and the radius R4 of the outer cladding is 62.5 μm.

4. The optical fiber according to claim 1, wherein the core layer is a multi-doped silica core layer, and dopants comprise germanium and fluorine, wherein the contribution of germanium to the refractive index of the core layer is 0-0.3%, the contribution of fluorine to the refractive index of the core layer is −0.05%-0, and the dopants have a continuous distribution in the core layer, the relative difference Δn0 in refractive index of the core layer is 0-0.25%, and the radius R0 of the core layer is 5-8 μm.

5. The optical fiber according to claim 1, wherein fluorine is introduced through freon or silicon tetrafluoride, the phosphorus is phosphorus pentoxide and introduced through the raw material phosphorus trichloride, aluminum is alumina and introduced through the raw material aluminum chloride.

6. The optical fiber according to claim 1, wherein the cladding further comprises a third sinking layer, located between the second sinking layer and the outer cladding.

7. The optical fiber according to claim 6, wherein the third sinking layer is a multi-doped quartz inner cladding, and dopants comprise fluorine, aluminum and phosphorus, wherein aluminum and phosphorus are doped in an amount of 0-5 mol %, and have a continuous distribution, the molar ratio of aluminum and phosphorus is 0.7-1.3:1, the contribution of fluorine to the refractive index of the third sinking layer is −0.05%-0, the contribution of the [AlPO$_4$] tetrahedron to the refractive index of the third sinking layer is −0.4%-0, the relative difference Δn3 in refractive index of the third sinking layer is −0.45%-0, and the radius R3 of the third sinking layer is 8-62.5 μm.

8. The optical fiber according to claim 1, wherein the attenuation of the optical fiber at a wavelength of 1550 nm is less than or equal to 0.18 dB/km.

9. The optical fiber according to claim 1, wherein the attenuation of the optical fiber at a wavelength of 1550 nm is less than or equal to 0.16 dB/km.

10. The optical fiber according to claim 1, wherein after the optical fiber is reacted for at least 16 h in 0.01 vol % H$_2$ at 70° C., the change in attenuation of the optical fiber at a wavelength of 1550 nm is less than or equal to 0.01 dB/km.

* * * * *